United States Patent [19]

Brandt et al.

[11] Patent Number: 5,687,607
[45] Date of Patent: Nov. 18, 1997

[54] METHOD OF MEASURING THE QUANTITY OF FUEL IN A TANK OF A SPACE VEHICLE SUCH AS A SATELLITE

[75] Inventors: Rolf Brandt, Oegstgeest; Bernhard Hufenbach, Amsterdam, both of Netherlands

[73] Assignee: Agence Spatiale Europeenne, Paris Cedex, France

[21] Appl. No.: 659,804

[22] Filed: Jun. 7, 1996

[30] Foreign Application Priority Data

Jun. 8, 1995 [FR] France ............... 95 06760

[51] Int. Cl.$^6$ ............... G01F 23/00
[52] U.S. Cl. ............... 73/290 R
[58] Field of Search ............... 73/290 R, 290 V, 73/304 C, 323, 304 R

[56] References Cited

U.S. PATENT DOCUMENTS

| | | | |
|---|---|---|---|
| 2,824,449 | 2/1958 | Childs | 73/304 C |
| 3,237,451 | 3/1966 | Haeff | 73/290 V |
| 3,389,602 | 6/1968 | Clemens | 73/290 |
| 3,540,275 | 11/1970 | Post et al. | 73/290 V |
| 3,596,510 | 8/1971 | Paine et al. | 73/290 B X |
| 3,639,835 | 2/1972 | Dammig, Jr. et al. | 73/304 C X |
| 4,898,030 | 2/1990 | Yeh | 73/290 V |
| 4,908,776 | 3/1990 | Crill et al. | 364/509 |
| 5,383,359 | 1/1995 | Challoner et al. | 73/290 R |

FOREIGN PATENT DOCUMENTS

| | | |
|---|---|---|
| 0 380 918 | 8/1990 | European Pat. Off. . |
| 0 397 480 | 11/1990 | European Pat. Off. . |
| 2 278 448 | 11/1994 | United Kingdom . |

*Primary Examiner*—Michael Brock
*Attorney, Agent, or Firm*—Sughrue,Mion,Zinn,Macpeak & Seas, PLLC

[57] ABSTRACT

The invention relates to a method of measuring the quantity of fuel in a tank of a space vehicle. It includes a step of measuring the level of fuel in the tank during at least one acceleration stage of the space vehicle. The level of fuel can be measured by detecting the level of fuel in a tube having a first end in communication with a first region of the tank which constitutes a bottom of the tank relative to an acceleration direction, and having a second end in communication with a second region of the tank that is spaced apart from the first region.

16 Claims, 3 Drawing Sheets

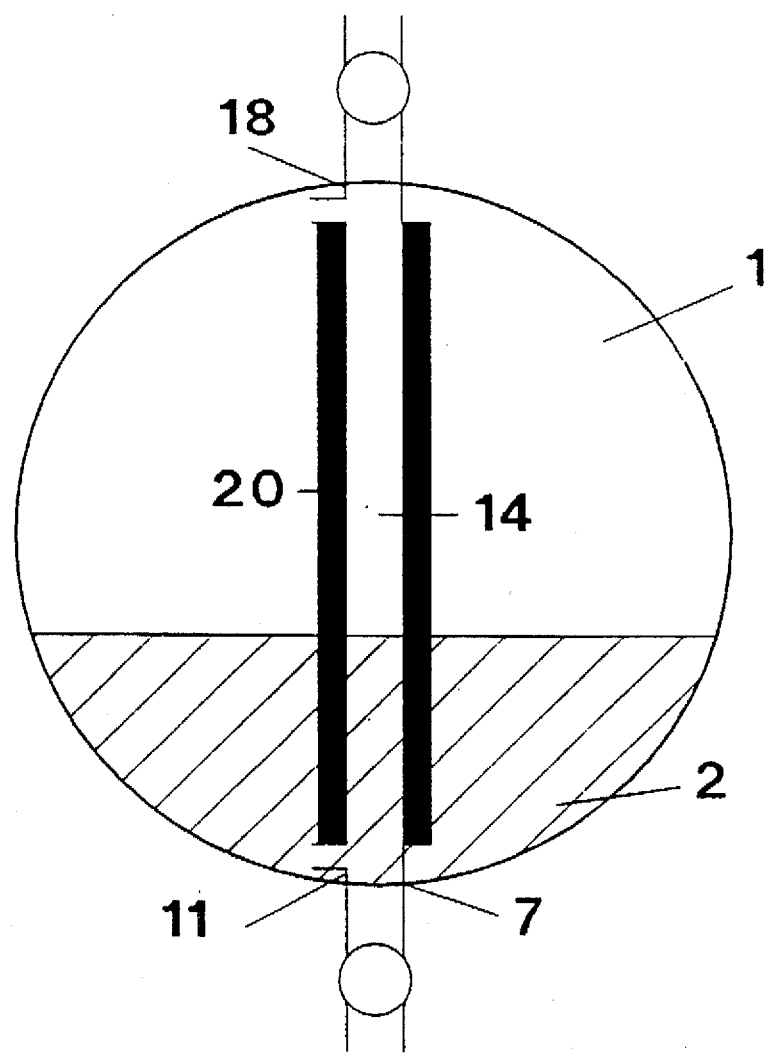

METHOD OF MEASURING THE QUANTITY OF FUEL IN A TANK OF A SPACE VEHICLE SUCH AS A SATELLITE

Technical progress with space vehicles, and in particular requirements for geostationary satellites to exit that orbit, makes it more and more necessary to be able to measure accurately the quantity of fuel available in the tank of a space vehicle such as a satellite.

BACKGROUND OF THE INVENTION

In particular, in the present state of the art, the quantity of fuel required for controlling the orbit and the attitude of a satellite for a period of one year is generally of the same order of magnitude as the measurement error concerning the quantity of fuel available. The inaccuracy with which the remaining mass of fuel is known can lead either to a premature end of life for the satellite, or else to premature initialization of the orbit-exiting maneuver. In the second case, the loss of mission duration is unacceptable, and if the satellite is commercial, there is a loss of earning power. Also, if the remaining mission time is known accurately, it is possible to appropriately plan manufacture and launch of a replacement satellite. The planning of scientific satellite missions similarly requires flexibility and depends also on knowledge being available concerning the mass of fuel remaining.

The condition of weightlessness in space means that measuring the quantity of liquid available in the tank of the space vehicle requires measurement techniques to be implemented that are, in general, very different from the techniques used on the ground. The techniques that are used at present, in particular the technique based on "gas laws", the so-called "thermal shock" technique, and the technique which consists in keeping track of consumption, all lead to accuracy of the order of 5% to 15% of the total volume of the tank. This corresponds to a level of uncertainty lying in the range 20% to 60% of mission duration for a geostationary satellite using a unified two-propellant system in which about 75% of the fuel is used up for placing the satellite in orbit. In addition, certain methods do not take account of incidents during which fuel leaks occur, so the uncertainty level is further increased.

Measurement techniques that are known or under study are listed below, and their advantages and drawbacks are outlined briefly.

While the satellite is being placed in orbit, it is possible to use the following techniques:

- an accelerometer can measure acceleration while the satellite is being placed in orbit, with the acceleration value being converted into fuel consumption by using rocket calibration data. That method suffers from the drawbacks not poor accuracy and of taking into account any possible leaks;
- a flow meter is used (presently under development) while the satellite is being placed in orbit. Although it is expected that such a system will provide very good accuracy, it nevertheless remains complex and expensive to implement.

Once the satellite is in orbit, the following techniques can be envisaged:

- measurement making use of the "gas laws": the temperature and the pressure of the tank are measured and the volume of the tank not occupied by the fuel is deduced therefrom and hence the mass of fuel remaining in the tank can be deduced. The accuracy of such measurement is low since it lies in the range 5% to 15% of the total volume of the tank;
- the technique in keeping track of consumption: this consists in computing the amount of fuel consumed during each maneuver by taking account of data recorded during each maneuver (duration, propulsion mode, rocket temperature, etc. . . ) and by taking account of calibration tests on each of the reactors as performed on the ground before the mission. This method has good intrinsic accuracy which is of the order of ±2% fuel consumption, however it is on top of the initial uncertainty on the quantity of fuel remaining once the satellite has been placed in orbit. It is therefore this accumulated inaccuracy that makes this method uncertain at present;
- the "thermal shock" method: all or part of the fuel tank is heated and its thermal capacity is measured, which capacity depends on the quantity of fuel. In spite of complicated mathematical modelling, this method does not produce accuracy better than 10% of the quantity of fuel remaining. In addition, the principle on which the measurement relies causes it to take non-negligible time;
- another technique, presently under development, is referred to as the "foreign gas injection" technique: it consists in transferring a known quantity of pressurization gas into the tank and in measuring the increase in pressure and temperature in order to determine the volume not occupied by the fuel and thus the mass of fuel remaining in the tank. This form of measurement is expected to give accuracy of better than ±5% of the total volume of the tank, but it requires complicated calibration, it is complex to implement, and it is expensive.

It can be seen from the above analysis that although methods presently in existence or under development can be expected to give accuracy of better than 1% of the total volume of the tank, such accuracy can be obtained only at high cost, given that the cost of a system, at present, is generally proportional to the looked-for degree of accuracy.

OBJECTS AND SUMMARY OF THE INVENTION

There is thus a need for a system that is capable of combining simultaneously high accuracy and reasonable cost.

To this end, the invention provides a method of measuring the quantity of fuel in a tank of a space vehicle, the method including a step of measuring the level of fuel in the tank during at least one period during which the space vehicle is subject to acceleration. The acceleration may be provided by reactors of the space vehicle, in particular while it is being placed in orbit, or the acceleration may be constituted by the centrifugal force that results from the space vehicle spinning.

Preferably, the fuel level is measured by detecting the level of fuel in a tube having a first end in communication with a first region of the tank constituting a bottom of the tank relative to an acceleration direction, and having a second end in communication with a second region of the tank spaced apart from the first region.

The level of fuel in the tube can be measured, in particular, by a capacitive method.

The tube may be disposed inside or outside the tank. It may have a measurement zone whose axis is substantially parallel to said acceleration direction.

The level of fuel can be measured with greater accuracy after correction for the angular offset between the nominal direction of the acceleration and the axis along which said acceleration is actually applied.

Accuracy can also be improved by correcting the fuel level measurement by a factor due to capillarity in the tube.

It is advantageous to place a screen inside the tank in the vicinity of the first end of the tube to prevent gas penetrating into the tube at the beginning of an acceleration stage, prior to the level of fuel in the tank stabilizing due to application of said acceleration.

One such acceleration stage may be constituted by placing the space vehicle in orbit. Given the accuracy with which level is measured, it is then possible, after the space vehicle has been placed in orbit, to perform residual measurement of the quantity of fuel by keeping track of the real fuel consumption of the space vehicle since being placed in orbit.

The invention also provides apparatus for implementing the method as described above and comprising:

a tank of fuel on board a space vehicle;

a tube having a first end in communication with a first region of the tank constituting a bottom of the tank relative to an acceleration direction, and having a second end in communication with a second region of the tank spaced apart from the first region; and a device for measuring the level of fuel in the tube.

The tube is advantageously located outside the tank and has a measurement zone with an axis that is substantially parallel to said acceleration direction of the satellite.

It is advantageous for the device to include a screen disposed inside the tank in the vicinity of the first end of the tube to avoid gas penetrating into the tube.

BRIEF DESCRIPTION OF THE DRAWINGS

Other characteristics and advantages of the invention appear more clearly on reading the following description given by way of non-limiting example and made with reference to the accompanying drawings, in which:

FIG. 5 illustrates an ultrasound measurement being performed in a tube of the invention and FIG. 6 is a diagram of a device constituting an alternate preferred embodiment with the tube located inside the tank.

MORE DETAILED DESCRIPTION

Figure 1:
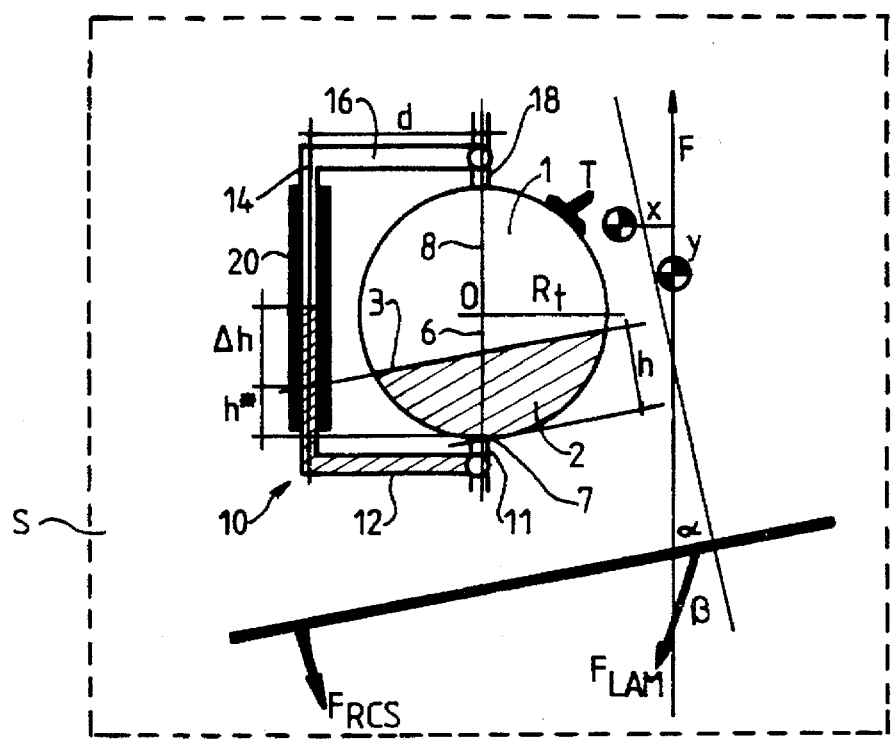
FIG. 1 shows a method of the invention for the case when acceleration is supplied by the reactors of a satellite.

FIG. 1 shows a method adapted to a fuel level measurement being performed while a maneuver is taking place that requires rockets of a satellite S to be fired. A tank 1 that is generally spherical in shape about a center O contains a certain quantity of a fuel 2, and it is subjected to acceleration due to thrust of the reactors parallel to an acceleration direction which is nominally the direction indicated by arrow F. A tube given general reference 10 is connected via its two ends 11 and 18 firstly to a bottom 7 of the tank and secondly to the top portion thereof. The concept of tank "bottom" relates to the acceleration direction F, i.e. the first end 11 of the tube opens out into the tank 1 in a region 7 situated substantially in the vicinity of the point of intersection between the wall of the tank 1 and the radius 6 extending from the center O parallel to the arrow F and in the opposite direction thereto. Similarly, the second end 18 opens out substantially at the intersection between the wall of the tank and the radius 8 extending in the opposite direction to the radius 6, i.e. traced from the center O parallel to the arrow F and in the same direction as the arrow.

The tube has two sections 12 and 16 that extend, e.g. perpendicularly to the arrow F, from its respective above-mentioned ends 11 and 12, and the opposite ends of those sections are interconnected by a measurement tube 14 extending parallel to the nominal acceleration direction F.

The depth of fuel 2 in the tank 1 is written h. The ideal depth of fuel in the tube 14 corresponding to the point of intersection of the tube with the plane defined by the surface 3 of the fuel is written h*, i.e. this is the depth that there would be in the tube 14 in the absence of any capillarity, and the real depth in the tube 14 as measured by a sensor 20 is written h*+Δh.

The distance between the axis of the tube 14 and the center O of the tank 1 is written d, the radius of the tank 1 is written $R_t$, the absolute temperature of the fuel in Kelvins is written T, and the acceleration to which the satellite is subjected is written g.

The angular offset of the axis of the satellite, i.e. the difference between the real acceleration direction and the nominal direction F is written α.

h thus represents the depth in the tank 1 corrected for the angular offset α and for capillarity Δh.

The thrust force of the main rocket of the satellite is written $F_{LAM}$, with the angular offset between said rocket and the ideal direction F being written β. The thrust force of the attitude control rocket is written $F_{RCS}$.

To determine the quantity of liquid available in the tank 1, it is necessary to perform three measurements in orbit, namely the level h*+Δh in the tube 14, the absolute temperature T of the fuel, and the acceleration g of the satellite.

A known value h then enables the quantity of fuel available to be obtained in application of the following equations (1) to (4):

$$h^* = (\Delta h + h^*) - \frac{2.\sigma(T)}{R_t g(\rho_1(T) - \rho_{vap}(T))} \cos(\phi) \qquad (1)$$

$$h = R_t(p, T) - \cos(\alpha)[R_t(p, T) - h^* + \tan(\alpha)R_t(p, T)] \qquad (2)$$

$$V = \frac{\pi}{3} h^2(3R_t(p, T) - h) \qquad (3)$$

$$m_p = \rho_1(T)V \qquad (4)$$

σ designates the surface tension of the fuel
φ designates the wetting angle
$\rho_1$ designates the density of the liquid fuel
$\rho_{vap}$ designates the density of the vaporized fuel
p designates the pressure in the tank
$m_p$ designates the mass of fuel in the tank.

The above equations show that the capillary depth Δh is a function of the temperature T of the fuel, the acceleration g, and the wetting angle φ. This angle φ is defined by the slope of the liquid surface where it touches the walls of the tube 14. This angle is a function of capillarity constants between the liquid and the vapor, between the liquid and the wall, and between the vapor and the wall. When the wall of the tube 14 is completely wetted, the value of φ is equal to 0. In practice, it can be considered that the angle φ is equal to 0, or that cos(φ)=1.

In practice, the tube 14 has an inside diameter lying in the range 6 mm to 12 mm. An acceleration of 0.4 m/s² is commonplace for putting a satellite into orbit using an engine developing a thrust of 400 N to 500 N, whereas an acceleration of 0.02 m/s² is usual for maneuvers performed by a satellite when using rockets delivering a thrust of the order of 10 N to 20 N. Although the capillarity depth $\Delta h$ could possibly be ignored in the first case, in the second case compensation is necessary given that the capillary depth $\Delta h$ is inversely proportional to the acceleration g.

In practice, depth in the tube 14 can be measured with an accuracy of about ±0.5 mm. The temperature of the fuel 2 can be measured with an accuracy of about ±1.5 K, the acceleration g of the satellite can be known to within ±0.5%, the radius $R_t$ of the tank 1 can be known with an accuracy of ±0.5 mm, and the angular offset angle $\alpha$ may be about 0.1°.

In practice, when acceleration is applied, the surface 3 of the fuel is subject to a sloshing phenomenon.

The dynamic behavior of fluids is governed by three forces: capillary forces; inertial forces; and viscous forces. In most cases, one of these forces can be ignored, thereby simplifying analysis of fluid motion. Three dimensionless parameters are used to characterize conditions of hydrodynamic behavior:

Bond's number $\quad Bo = \dfrac{\rho \times g \times L^2}{\sigma}$

Weber's number $\quad We = \dfrac{\rho \times L \times V^2}{\sigma}$

Froude's number $\quad Fr = \dfrac{V^2}{L \times g}$ $\rho$ designates the density of the fluid (in kg/m³)
L the length of the tank (in m)
V the speed of the fluid (in m/s)
$\sigma$ the surface tension of the fluid (in N/m)
g the acceleration (in m/s₂).

The fuel used for propelling a satellite is generally monomethylhydrazine and the values are as follows:

$\rho = 875$ kg/m³
$\sigma = 0.0339$ N/m
L = 0.25 m $(R_t)$

In this case, the Bond's number is the most appropriate parameter.

Placing in orbit:     1)

$F = 400$ N    $g = 0.44$ m/s²
mass of satellite = 1000 kg    $Bo = 644$

Maneuvering in orbit:     2)

$F = 2 \times 10$ N    $g = 0.02$ m/s²
mass of satellite = 1000 kg    $Bo = 32$

In both cases, the equilibrium surface under steady conditions is situated with good accuracy in a plane perpendicular to the orientation of the acceleration vector. Surface tension effects are negligible for this parameter (Bo>10). In other words, whatever the position of the fluid in a state of zero gravity, an acceleration along a specific direction will give rise to a free surface of the fluid 3 that extends perpendicularly to the real direction of acceleration.

The time required for sloshing of the fluid surface 3 to settle down and for a stable state to be achieved is also directly related to Bond's number.

The main causes of uncertainty concerning measurements performed during maneuvers for placing a satellite in orbit are uncertainty concerning the radius $R_t$ of the tank 1 and on the measured level of the liquid, while the error in measuring the temperature T of the fuel and the acceleration g are secondary causes of uncertainty.

When measurements are performed while maneuvering in orbit, the main cause of inaccuracy is an error in measuring acceleration on which the correction for the depth $\Delta h$ depends, and also an error in measuring the temperature T of the fuel 2.

In any event, the accuracy of the proposed measurement method increases with decreasing quantity of fuel in the tank 1. This is because of the shape of the tank 1, which means that as the tank empties, a given change in the depth of the fuel 2 in the tank corresponds to smaller and smaller changes in the volume of the fuel.

It is possible to obtain an accuracy of about ±0.1% of the nominal value of the tank 1 at the end of maneuvers for placing the satellite in orbit. This very high accuracy leads to a very accurate estimate of the mass available at the beginning of operations in orbit. The relatively simple method of keeping track of consumption can then take over, and can be used throughout the lifetime of the satellite in orbit since it provides accuracy which is intrinsically better than 2% of satellite consumption. Given that about 80% of the fuel 2 is consumed while placing the satellite in orbit and that the initial accuracy which is about 0.1% is relatively high, the resulting accuracy at the end of operation shortly before the maneuver for quitting orbit is about ±0.4% of the nominal fill of the tank 1.

Similarly, measurement accuracy obtained by direct measurement while maneuvering in orbit, at the end of a mission shortly before the maneuver for quitting orbit, is of the order of ±0.5% of the total quantity of fuel initially loaded into the tank 1.

The two measurement methods are thus practically equivalent as to the accuracy with which the quantity of fuel is known at the time a decision is taken to quit the orbit.

Figure 2A:
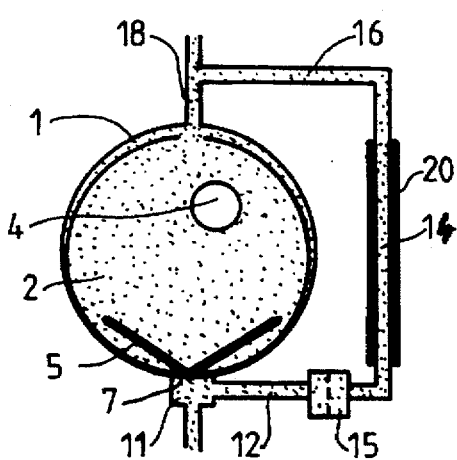
FIGS. 2a and 2b show a device constituting a preferred embodiment of FIG. 1 respectively outside an acceleration stage and during an acceleration stage.
Figure 2B:
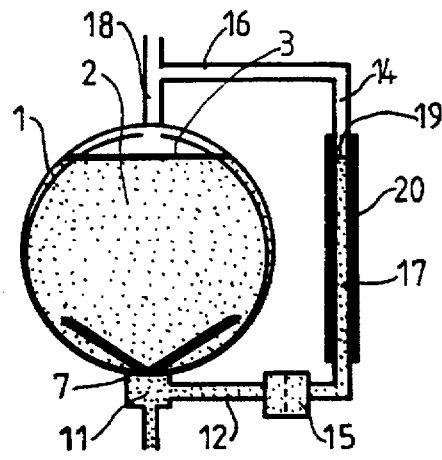

FIGS. 2a and 2b show a preferred variant of the invention in which a screen 5 of generally conical shape is disposed in the vicinity of the end 11 of the tube 12 so as to overlie the inside wall of the tank 1. This makes it possible to prevent gas 4 penetrating into the measurement tube when acceleration is applied along the arrow F (FIG. 2b).

In addition, a filter 15 can be disposed in the section of the tube 12.

Figure 3:
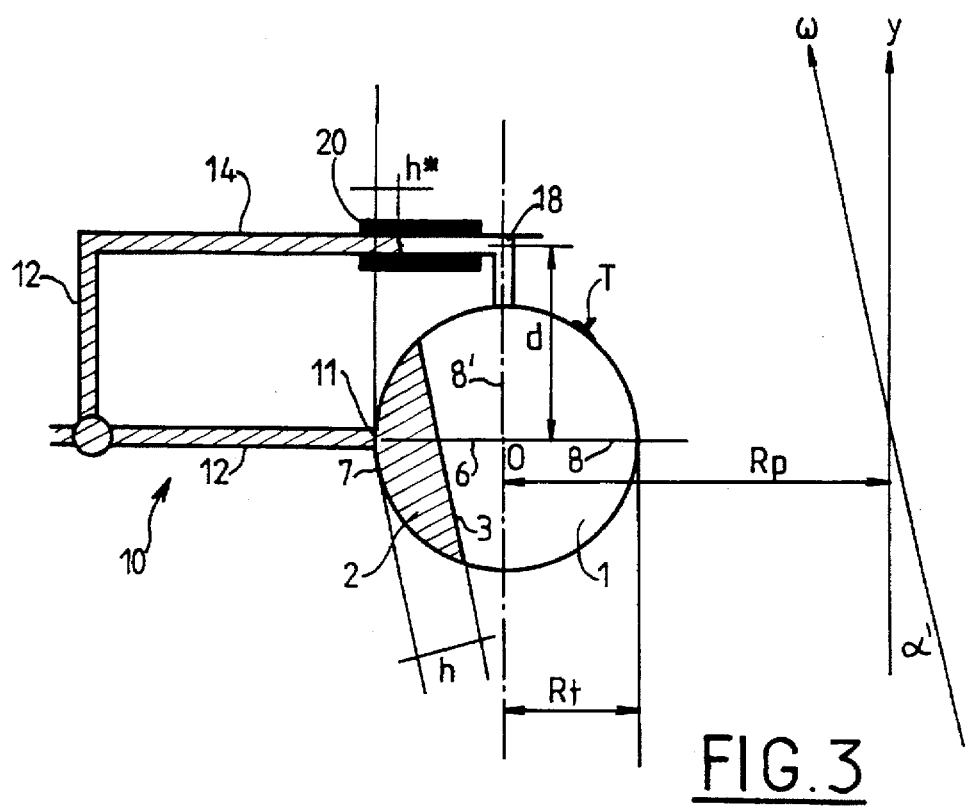
FIG. 3 shows a device of the invention for the case when a satellite is spinning.

FIG. 3 shows measurement being performed in orbit for a satellite spinning about a nominal spin axis y. The bottom 7 of the tank is selected as a function of an acceleration direction which can be any direction that is radial relative to the axis y, the radius 6 being in alignment with said radial direction, i.e. it intersects the axis y and is perpendicular thereto. $\omega$ designates the real spin axis of the satellite which is at an angular offset $\alpha'$ relative to the axis y. $R_p$ designates the distance between the center O of the tank 1 and the axis y. The other symbols have the same meanings as in FIG. 1. It will be observed that given that these measurements are performed in orbit, i.e. after a large amount of fuel has been consumed, approximately 75% to 80% of the initial volume, the outlet 18 of the tube 16 is no longer opposite the end 11 but is in a central region of the tank at the end of a radius 8' perpendicular to the radius 6. The axis of the tube 14 is disposed radially relative to the axis y.

The depth h is computed using the following equations (5), (6), and (7):

$$h = R_t(p,T) - \cos(\alpha')[R_t(p,T) - h^* + \tan(\alpha') R_p(p,T)] \quad (5)$$

$$V = f(h, T, p, R_p, R_t) \quad (6)$$

$$m_p = \rho(T) V \quad (7)$$

This method makes it possible to measure the level of liquid in the tank 1 continuously while the satellite is in orbit.

Figure 4:
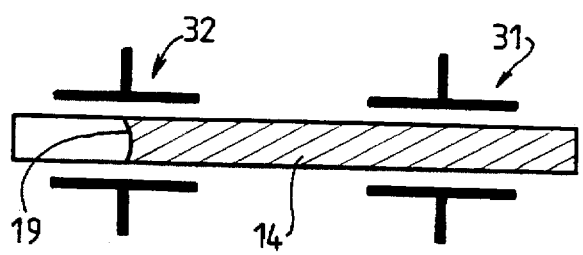
FIG. 4 is a diagram of capacitive level sensors implemented on a tube of the invention.

FIG. 4 shows capacitive measurement, which is the preferred method of measuring level in the tube 14. The tube 14 forms the dielectric of two capacitors 31 and 32 that are spaced apart from each other and the capacitance between the electrodes of each of the capacitors 31 and 32 is measured.

Figure 5:
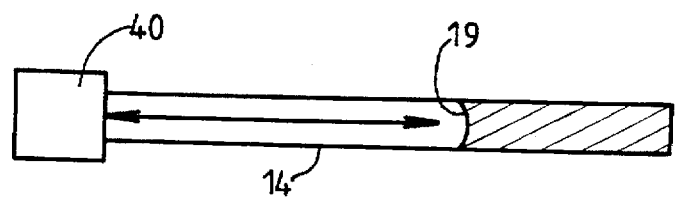

FIG. 5 shows a variant method of measurement that makes use of ultrasound 40, in which an ultrasound signal is sent towards the interface 19 between the liquid fuel 2 and the remainder of the tube 14. The level is detected by measuring the go-and-return travel time for a signal emitted by the ultrasound emitter 40.

FIG. 6 shows an alternate preferred arrangement with the tube 14 located inside the tank 1. All numerals used correspond to those employed in the embodiment of FIG. 1 with the tube positioned outside the tank.

We claim:

1. A method of measuring the quantity of fuel in a tank of a space vehicle, the method including a step of measuring the level of fuel in the tank during at least one acceleration stage of the space vehicle and wherein the fuel level is measured by detecting the level of fuel in a tube having a first end in communication with a first region of the tank constituting a bottom of the tank relative to an acceleration direction, and having a second end in communication with a second region of the tank spaced apart from the first region.

2. A method according to claim 1, wherein said acceleration is provided by reactors of the space vehicle.

3. A method according to claim 2, wherein said measurement is performed while the fluid equilibrium surface is under steady conditions.

4. A method according to claim 1, wherein said space vehicle is placed in orbit it spins about an axis, and wherein said acceleration is constituted by the centrifugal force that results from spinning about an axis.

5. A method according to claim 4, wherein the tube is disposed outside the tank and has a measurement zone with an axis that is substantially parallel to said acceleration direction.

6. A method according to claim 5, including a screen disposed inside the tank in the vicinity of the first end of the tube to prevent gas penetrating into the tube at the beginning of an acceleration stage, prior to the level of the fuel in the tank stabilizing after said acceleration had been applied.

7. A method according to claim 5, wherein said step of measuring fuel includes applying a correction due to the angular offset between the nominal acceleration direction and the axis of said acceleration.

8. A method according to claim 4, wherein the tube is disposed inside the tank.

9. A method according to claim 4, wherein said step of measuring the level of fuel includes correcting the level detected in the tube by an amount due to capillarity in the tube.

10. A method according to claim 1, wherein said level of fuel in the tube is measured by a capacitive method.

11. A method according to claim 1, wherein one of said acceleration stages is placing the space vehicle in orbit.

12. A method according to claim 11, wherein said space vehicle is placed in an orbit, and the quantity of fuel is measured by keeping track of consumption since said space vehicle was placed in an orbit.

13. Apparatus for implementing the method according to claim 1, comprising:

a fuel tank on board said space craft;

a tube having a first end in communication with a first region of the tank constituting a bottom of the tank relative to an acceleration direction, and having a second end in communication with a second region of the tank spaced apart from the first region; and a device for measuring the level of fuel in the tube.

14. Apparatus according to claim 13, wherein the tube is disposed outside the tank and has a measurement zone with an axis substantially parallel to said acceleration direction of the satellite.

15. Apparatus according to claim 14, including a screen disposed inside the tank in the vicinity of the first end of the tube to avoid gas penetrating into the tube.

16. Apparatus according to claim 13, wherein the tube is disposed inside the tank.

* * * * *